United States Patent
Hansen, Jr. et al.

[11] Patent Number: 5,304,748
[45] Date of Patent: Apr. 19, 1994

[54] METHODS AND APPARATUSES FOR MUFFLING POWER PLANT STEAM EXHAUST

[75] Inventors: Marvin L. Hansen, Jr., Friendswood; Jesse D. Frederick, Houston, both of Tex.

[73] Assignee: Destec Engineering, Inc., Houston, Tex.

[21] Appl. No.: 817,436

[22] Filed: Jan. 6, 1992

[51] Int. Cl.⁵ .......................... F01N 1/14; F01N 3/04
[52] U.S. Cl. ...................................... 181/262; 60/310
[58] Field of Search ............... 181/220, 221, 233, 234, 181/235, 249, 250, 251, 255, 257, 259, 260, 261, 262, 263; 60/310

[56] References Cited

U.S. PATENT DOCUMENTS

| | | | |
|---|---|---|---|
| 977,976 | 12/1910 | Smith | 181/235 |
| 1,069,945 | 8/1913 | Hall | 181/235 |
| 2,238,816 | 4/1941 | Maxim et al. | 181/276 |
| 2,306,636 | 12/1942 | Maxim | 181/260 |
| 2,328,161 | 8/1943 | Maxim | 181/260 |
| 2,360,429 | 10/1944 | Leadbetter | 181/260 |
| 2,516,948 | 8/1950 | Bourne | 181/260 |
| 2,535,660 | 12/1950 | Wynn | 181/262 |
| 3,372,540 | 3/1968 | Birdwell | 60/310 |
| 3,379,277 | 4/1968 | Willy | 181/260 |
| 3,383,854 | 5/1968 | White | 60/310 |
| 3,715,009 | 2/1973 | Smith et al. | 181/221 |
| 3,899,923 | 8/1975 | Teller | 181/221 |
| 3,976,456 | 8/1976 | Alcock | 60/310 |

*Primary Examiner*—Michael L. Gellner
*Assistant Examiner*—Khanh Dang

[57] ABSTRACT

Methods and apparatuses for muffling steam exhausted from a power plant, in one aspect, the method including flowing the steam into and through a submerged hollow pipe having a plurality of holes spaced apart along it and one or more water eduction tubes through which, due to the effect of the flowing steam, water is sucked into the hollow pipe.

6 Claims, 1 Drawing Sheet

METHODS AND APPARATUSES FOR MUFFLING POWER PLANT STEAM EXHAUST

BACKGROUND OF THE INVENTION

1. Field Of The Invention

This invention is in the field of muffling steam exhausted during steam blows at a relatively high temperature and noise level from a power plant.

2. Description Of Related Art

During the start-up of a typical cogeneration power plant, an enormous amount of steam under pressure is released to the environment through steam piping at a very high noise level.

This steam contains solid debris that contaminates the steam system and is of such a quality that it cannot be used efficiently, nor can it be re-cycled. Consequently, it is vented to the atmosphere. Since it contains no toxic materials, the problems associated with venting the steam relate to its heat, pressure, and noise level.

The noise level of this steam can rise to 180 decibels and can be heard several miles away. In the past, this steam was simply vented without any muffling or attempts were made to muffle it with water-spray mufflers. These attempts were not practical because of the expense of the required equipment and the large amount of water that was required. The following references relate to muffling, but do not recognize or address the problems solved by the present invention:

U.S. Pat. No. 1,069,045 discloses an underwater exhaust and muffler for a boat engine, the exhaust and muffler attached to a hull of the boat and having a pipe which extends through the hull. The upper end of a vertical portion of the pipe is connected to a discharge pipe of the engine. Forward movement of the boat forces water into a plurality of passages formed by internal walls in a horizontal portion of the pipe. Engine exhaust encounters the water forced through the pipe. Also, the engine exhaust enters the water through a plurality of exit openings.

U.S. Pat. No. 2,535,660 discloses an exhaust silencer for internal combustion engines which has an outer casing with one or more inlet pipes disposed in a cooling chamber. Exhaust gases enter the casing through the pipes and pass through partition into a spent gas chamber to an outlet. One or more openings in the inlet end of the chamber permit air to enter the cooling chamber.

U.S. Pat. No. 977,976 discloses an underwater exhaust and muffler for a boat's internal combustion engine. The exhaust and muffler includes a fitting with a plurality of internal tapering ports, internal baffle plates, and exhaust openings.

U.S. Pat. No. 2,360,429 discloses a silencer for gases in an internal combustion engine's exhaust with an outer shell divided into an inlet chamber and an outlet chamber by a partition. The engine exhaust gases enter the inlet chamber through one opening and liquid is conveyed in a controlled-flow fashion into the chamber through another opening. By removing a plug in the outlet chamber, liquid can be drained from the device during inactivity. The exhaust gases flow through a tilted conduit disposed between the two chambers.

U.S. Pat. No. 3,379,277 discloses a wet exhaust system for exhaust gases of marine internal combustion engines which has a sound-absorbing conduit with which a cooling fluid is introduced. The muffler is attached to an engine and is exhausted to the atmosphere at the stern of a boat.

U.S. Pat. No. 3,715,009 discloses a water-cooled jet engine noise suppression system and U.S. Pat. No. 3,899,923 discloses an apparatus for muffling and testing jet engine exhausts.

U.S. Pat. Nos. 2,306,636; 2,328,161; 2,238,816; and 2,516,948 disclose multi-chamber silencers for silencing the exhaust gases of submarines' engines. Water entering the silencers mingles with the engine exhaust gases.

There has long been a need for effective methods and apparatuses for muffling the steam exhausted from a cogeneration power plant. There has long been a need for such methods and apparatuses which can effectively reduce the temperature, pressure, and noise of such exhausts.

SUMMARY OF THE PRESENT INVENTION

The present invention, in one embodiment, discloses a method for muffling the steam exhausted from a power plant that includes the steps of connecting the steam exhaust outlet with an exhaust apparatus according to the present invention and then flowing the exhausted steam from the steam exhaust outlet to the exhaust apparatus and permitting the steam to flow into and through the exhaust apparatus.

In one embodiment, a system according to the present invention includes a long hollow pipe submerged in a body of water, the pipe having an inlet, an outlet, and a plurality of openings spaced-apart along its length. The openings allow the steam to condense and permit the discharge of water and steam. One or more water eduction tubes interconnected with the pipe provide for water to be sucked into the pipe due to the pressure drop created within the pipe by the steam flowing under pressure through the pipe. The pipe outlet may be partially or completely closed off to flow. One or more pressure ports may be provided on the pipe for measuring pressure in the submerged pipe during or after a muffling operation. The pipe may be held down under the water by appropriate weights or securement apparatuses, e.g. concrete sleepers and blocks.

It is, therefore, an object of at least certain preferred embodiments of the present invention:

To provide new, useful, unique, efficient, and effective devices and methods for muffling the steam exhaust from a cogeneration power plant;

To provide such devices and methods which effectively reduce the noise level of such exhausts;

To provide such methods and devices for effective dissipation of the heat of such exhausts;

To provide such methods and devices for effective handling of the high pressure steam of such exhausts;

To provide such devices and methods which employ readily-available environmentally-sensitive and relatively simple components; and The present invention recognizes and addresses the previously-mentioned long-felt needs and provides a satisfactory meeting of those needs in its various possible embodiments. To one of skill in this art who has the benefits of this invention's teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions of further improvements.

DESCRIPTION OF THE DRAWINGS

So that the manner in which the above-recited features, advantages and objects of the invention, as well as others which will become clear, are attained and can be understood in detail, more particular description of the invention briefly summarized above may be had by reference to certain embodiments thereof which are illustrated in the appended drawings, which drawings form a part of this specification. It is to be noted, however, that the appended drawings illustrate preferred embodiments of the invention and are therefore not to be considered limiting of its scope, for the invention may admit to other equally effective equivalent embodiments.

DESCRIPTION OF EMBODIMENTS PREFERRED AT THE TIME OF FILING FOR THIS PATENT

Figure 1:
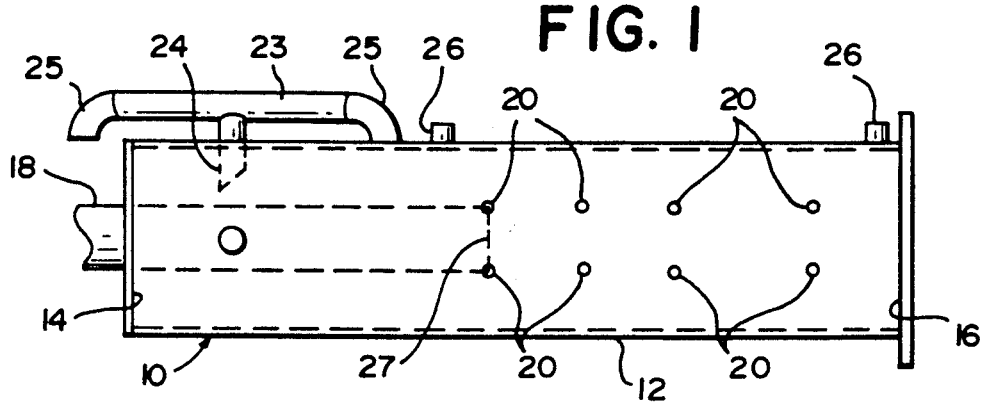
FIG. 1 is a side view of a system according to the present invention.
Figure 2:
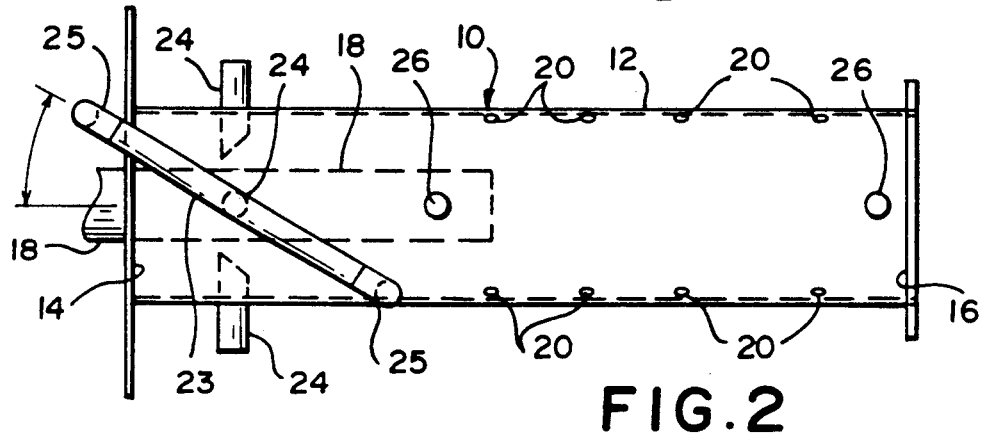
FIG. 2 is an top view of the system of FIG. 1.
Figure 3:
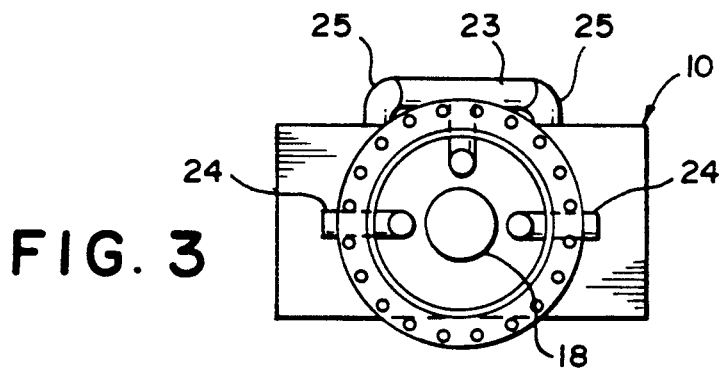
FIG. 3 is an end view of the system FIG. 1.

Referring now to FIGS. 1, 2 and 3, a system 10 according to the present invention has a main hollow pipe 12 with an inlet end wall 14 and a distal end wall 16. Steam enters the interior of the hollow pipe 12 through a steam inlet 18. Water and steam flow through a plurality of vent holes 20 in the hollow pipe 12. Initially when the pipe 12 is submerged, it fills With water flowing through the holes. Preferably, the holes are in opposed horizontal rows to better resist thrust force of the steam. Steam introduced into the pipe displaces water in the pipe. Water is sucked into the hollow pipe 12 due to the effect of the in-rushing steam through three water eduction tubes 24 spaced apart about the circumference of the hollow pipe 12. Pressure in the pipe may be measured through one or more pressure ports 26.

The top eduction tube 24 is secured to and communicates with a cross pipe 23 which has two curved entry ends 25 through which water is drawn into the interior of the pipe 12. Preferably, several holes 20 are positioned near an outlet 27 of the steam inlet 18. Preferably, the entry of the eduction tubes into the pipe 12 is behind (to the left in FIGS. 1 and 2) the outlet 27 of the steam inlet 18. Similarly, it is preferred that the entry ends 25 of the cross pipe 23 be behind the outlet 27.

Figure 4:
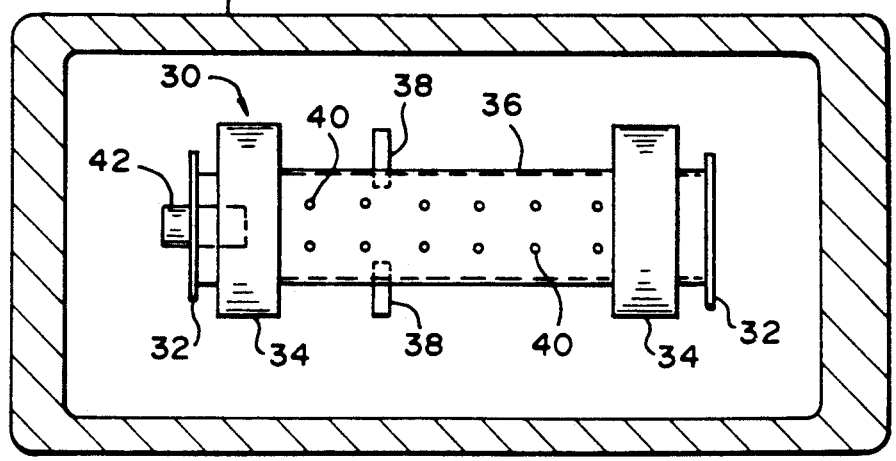
FIG. 4 is a top view of a system according to the present invention.

As shown in FIG. 4, a system 30 is disposed in a reservoir 31 with the water level above a hollow pipe 36 which is secured to and supported by mounts 32 and is held in place with concrete anchors 34.

In one embodiment, the reservoir contains about 45,000 gallons of water; the hollow pipe is about 2 feet in diameter and about 80 feet long; there are 150 vent holes which are 1½ inches in diameter and about 6 inches apart; the steam inlet is about 8 inches in diameter; and the eduction tubes are about 3 inches in diameter. Such a system has been used to reduce 900 pound steam flowing at 90,000 pounds per hour and at a temperature of 650 degrees Fahrenheit and a noise level of 150 decibels to a noise level of 75 decibels (ambient noise level for a running plant during the day is typically about 72 to 73 decibels, i.e. use of certain preferred embodiments of this invention result in a rise in noise level of only about 2 decibels).

The concrete anchors 34 bear on the pipe 36 and side of the anchors (not shown) rest on the bottom of the reservoir 31. Water flows into the pipe through two eduction tubes 38 and steam flows into the pipe through a steam inlet 42. Steam and water flow out through one or more series of holes 40. The far end of the pipe 36 (the left of FIG. 4) (and the far end of the pipe 12, FIG. 1) may be open or closed, or partially open. It is preferred that eduction tubes (e.g. tubes 38 or 24) be spaced apart about a pipe's circumference, most preferably about 90 degrees apart when the pipe is viewed from the end.

With respect to steam exhausted at a noise level of 180 decibels, systems according to this invention can provide a reduction of about at least 55 decibels and most preferably a reduction by about 110 decibels. Typically, hollow pipes used in preferred embodiments of this invention range in diameter between about 1½ and 3 feet and are used with steam inlets ranging in diameter between 3 to 12 inches. These systems can muffle power plant steam, e.g. steam of at least 900 pounds per square inch gauge and at a temperature of at least 534 degrees Fahrenheit. It is preferred that the hollow pipe be at least 80 feet long and that the pipe be submerged in at least 45,000 gallons of water. It is preferred that an 80 foot long pipe be secured by a total weight of anchors of at least one ton (e.g. several concrete anchors weighing a total of one ton). It is also preferred that water be present at a level about 2 feet above the pipe.

It is preferred that the ratio of the inner diameter of the water eduction tubes to the inner diameter of the pipe be about 1 to 2 and that the tubes be located about 1 foot away from the hollow pipe's inlet. It is preferred that the ratio of the inner diameter of the steam flow line to the inner diameter of the pipe range between a ratio of about 1 to 8 and a ratio of about 1 to 2, with a ratio of 1 to 3 most preferred.

In conclusion, therefore, it is seen that the present invention and the embodiments disclosed herein are well adapted to carry out the objectives and obtain the ends set forth at the outset. Certain changes can be made in the method and apparatus without departing from the spirit and the scope of this invention. It is realized that changes are possible and it is further intended that each element or step recited in any of the following claims is to be understood as referring to all equivalent elements or steps for accomplishing substantially the same results in substantially the same or equivalent manner. It is intended to cover the invention broadly in whatever form its principles may be utilized. The present invention is, therefore, well adapted to carry out the objects and obtain the ends and advantages mentioned, as well as others inherent therein.

What is claimed is:

1. A muffling system for muffling steam exhausted from a power plant and reducing noise level of the steam by at least 55 decibels comprising
    a water reservoir,
    a steam flow line between the plant steam outlet and the muffling system,
    a hollow pipe submerged in the water reservoir and with a steam flow channel therethrough defined by an interior surface of a pipe wall and having an inner diameter, a pipe inlet at a first end of the pipe, and a distal end wall closing off a second end of the pipe spaced apart from the first end and the pipe connected to the steam flow line for receiving the steam, three hollow water eduction tubes having an inner diameter and mounted to the pipe, the tubes in fluid communication with the pipe's interior and disposed so that steam flowing through the pipe causes water to be sucked through the tubes into the pipe, the tubes spaced apart by about at least 90 degrees of arc of the pipe as viewed from its end, the pipe filled with water prior to flowing of steam therethrough, and a plurality of holes spaced-apart along the pipe.

2. A muffling system for muffling steam exhausted from a power plant, the steam having a noise level and exiting from a plant steam outlet, the system comprising a water reservoir containing at least 45,000 gallons of water, a steam flow line between the plant steam outlet and the muffling system, a hollow pipe submerged in the reservoir, the hollow pipe at least 80 feet long and with a steam flow channel therethrough defined by an interior surface of a pipe wall and having an inner diameter, a pipe inlet at a first end of the pipe, the pipe connected to the steam flow line for receiving the steam, at least one hollow water eduction tube having an inner diameter and mounted to the pipe, the at least one tube in fluid communication with the pipe's interior and disposed so that steam flowing through the pipe causes water to be sucked through the at least one tube into the pipe, the pipe filled with water prior to flowing of steam therethrough, and a plurality of holes through and spaced-apart along the pipe.

3. A muffling system for muffling steam exhausted from a power plant, the steam having a noise level and exiting from a plant steam outlet, the system comprising a water reservoir, a steam flow line between the plant steam outlet and the muffling system, a hollow pipe submerged in the reservoir, the hollow pipe with a steam flow channel therethrough defined by an interior surface of a pipe wall and having an inner diameter, a pipe inlet at a first end of the pipe, the pipe connected to the steam flow line for receiving the steam, at least one hollow water eduction tube having an inner diameter and mounted to the pipe, the at least one tube in fluid communication with the pipe's interior and disposed so that steam flowing through the pipe causes water to be sucked through the at least one tube into the pipe, the pipe filled with water prior to flowing of steam therethrough, and a plurality of holes through and spaced-apart along the pipe, each hole about 1½ inches in diameter, the holes spaced about 6 inches apart on the hollow pipe.

4. A muffling system for muffling steam exhausted from a power plant, the steam having a noise level and exiting from a plant steam outlet, the system comprising a water reservoir, a steam flow line between the plant steam outlet and the muffling system, a hollow pipe submerged in the reservoir, the hollow pipe having a circumference, the hollow pipe with a steam flow channel therethrough defined by an interior surface of a pipe wall and having an inner diameter, a pipe inlet at a first end of the pipe, the pipe connected to the steam flow line for receiving the steam, three hollow water eduction tubes equally spaced apart about the hollow pipe's circumference and having an inner diameter and mounted to the pipe, the tubes in fluid communication with the pipe's interior and disposed so that steam flowing through the pipe causes water to be sucked through the tubes into the pipe, the pipe filled with water prior to flowing of steam therethrough, and a ratio of the inner diameter of the water eduction tubes to the inner diameter of the pipe is about 1 to 8 to about 1 to 2, and a plurality of holes through and spaced-apart along the pipe.

5. The system of claim 4 wherein the water eduction tubes are disposed about 1 foot away from the hollow pipe's inlet.

6. A muffling system for muffling steam exhausted from a power plant, the steam having a noise level and exiting from a plant steam outlet, the system comprising a water reservoir, a steam flow line between the plant steam outlet and the muffling system, a hollow pipe submerged in the reservoir, water in the reservoir at a level about 2 feet above the pipe, the hollow pipe with a steam flow channel therethrough defined by an interior surface of a pipe wall and having an inner diameter, a pipe inlet at a first end of the pipe, the pipe connected to the steam flow line for receiving the steam, at least one hollow water eduction tube having an inner diameter and mounted to the pipe, the at least one tube in fluid communication with the pipe's interior and disposed so that steam flowing through the pipe causes water to be sucked through the at least one tube into the pipe, the pipe filled with water prior to flowing of steam therethrough, and a plurality of holes through and spaced-apart along the pipe.

* * * * *